Figure 1:
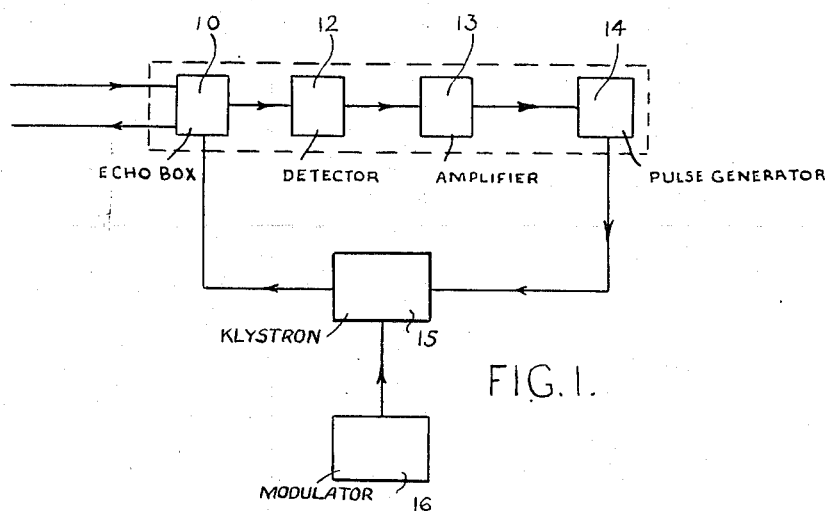

March 6, 1951     H. R. WHITFIELD ET AL     2,544,204
RADAR RESPONDER BEACON

Filed Aug. 3, 1949     3 Sheets-Sheet 1

INVENTORS:
HAROLD RAYMOND WHITFIELD
ALBAN HARRISON
By Richardson, David and Nordon
ATTYS

INVENTORS:
HAROLD RAYMOND WHITFIELD
ALBAN HARRISON

March 6, 1951  H. R. WHITFIELD ET AL  2,544,204
RADAR RESPONDER BEACON

Filed Aug. 3, 1949  3 Sheets-Sheet 3

INVENTORS
HAROLD RAYMOND WHITFIELD
ALBAN HARRISON
By Richardson, David and Nordon
Attys Patented Mar. 6, 1951

2,544,204

UNITED STATES PATENT OFFICE 2,544,204

RADAR RESPONDER BEACON

Harold Raymond Whitfield and Alban Harrison, Barkingside, England, assignors to Henry Hughes & Son Limited, Barkingside, England, a company of Great Britain Application August 3, 1949, Serial No. 108,344
In Great Britain August 5, 1948

5 Claims. (Cl. 250—17)

This invention relates to responder beacons suitable for use in co-operation with pulse radar sets.

Various devices have been proposed which upon receipt of an interrogating pulse of radio frequency energy, transmitted within a certain band of frequencies, transmit a further pulse or a coded succession of pulses. However, such responder devices have been arranged to have the frequency to which they are tuned swept periodically through the whole band covered by the equipments with which they have been required to co-operate, the devices only being in a condition to respond to a given interrogating equipment for a comparatively small fraction of each cycle of the sweep. Such devices suffer from the disadvantages that they are comparatively complicated and have a relatively high power consumption, and that when they are co-operating with an equipment emitting a narrow beam there is a possibility that at the time the beam is directed on to the responder devices they will not be in a condition to respond; that is to say either no response will be given by the device to the interrogating equipment, or the response will be erratic.

It is the principal object of the invention to provide a responder beacon suitable for co-operation with radar sets working in a predetermined frequency band which is capable of both receiving and responding adequately to the pulses transmitted from any radar set working at a frequency within the band and which is of comparatively simple construction and low power consumption.

A further object of the invention is to provide an improved responder beacon suitable for siting in an inaccessible position, for example on a buoy.

According to the present invention we provide, in a beacon for co-operation with pulse radar sets operating in different, relatively narrow frequency bands within a predetermined, relatively wide band of radio frequencies, a receiver sensitive to incident radiation of any of a large number of frequencies distributed over the said band, an oscillator normally maintained in a quiescent condition and adapted to be triggered by the output from the said receiver to cause pulses of radio frequency oscillations to be generated by the said oscillator and means for further modulating the said oscillations to distribute radio frequency components thereof over the whole of the said relatively wide frequency band. The frequency-difference between adjacent ones of said components is arranged to be less than the bandwidth of any of the interrogating receivers concerned.

The beacon receiver may conveniently comprise a hollow resonator having a large number of resonances within the said relatively wide band and of sufficient size for the separation between its successive resonance frequencies within the relatively wide band to be less than the band width occupied by the transmitted pulse from any radar set with which the beacon is required to co-operate, the resonator feeding a crystal detector (which may be of known type) the output from which is fed to an amplifier whose output is fed to a pulse-generator of any convenient kind. The pulse generator may comprise for example a blocking oscillator together with an artificial line for generating suitably coded pulses for modulating the oscillator.

The oscillator may conveniently comprise a reflector Klystron oscillator of known type, the output pulses from the receiver or from the pulse generator being applied as negative modulating pulses to its cathode.

The further modulation may conveniently be obtained by applying an oscillatory voltage of suitable amplitude and frequency to frequency-modulate the Klystron output in such a manner that the side bands fulfil the conditions stated. This oscillatory voltage may be applied to the reflector either continuously or from a further oscillator triggered by a suitable pulse from the receiver in a well-known manner.

Figure 2:
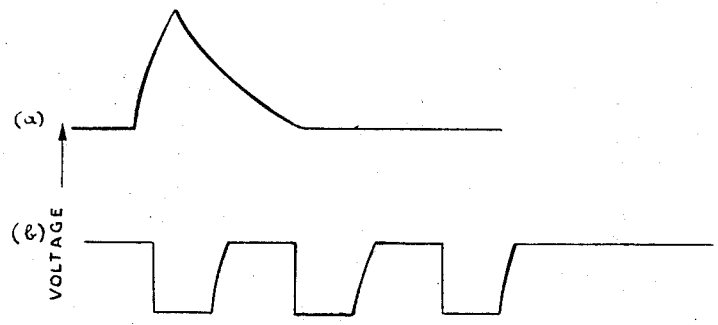
Figure 2:
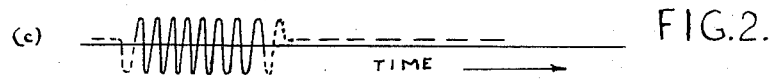
Figure 3:
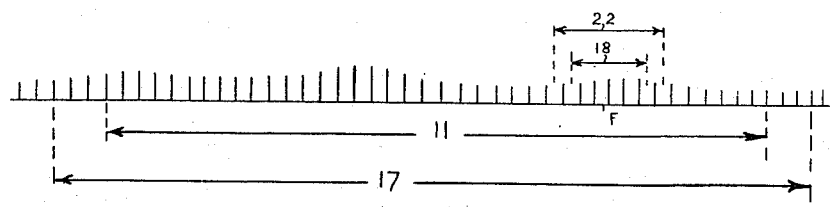
Figure 4:
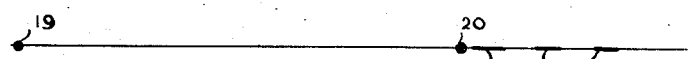
Figure 5:
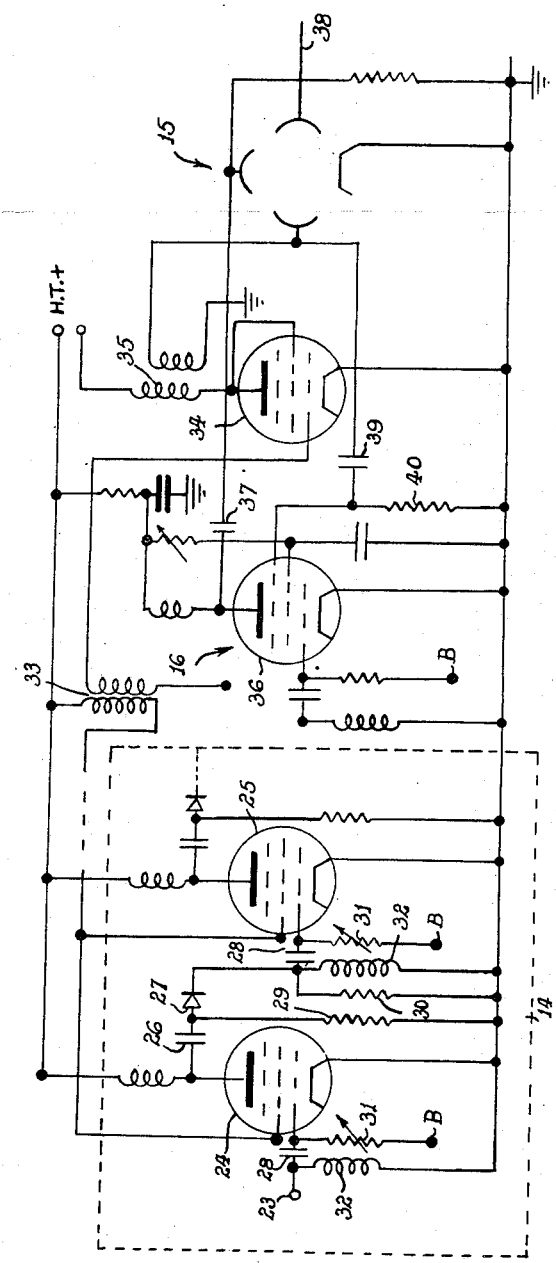
Figures 6, 7:
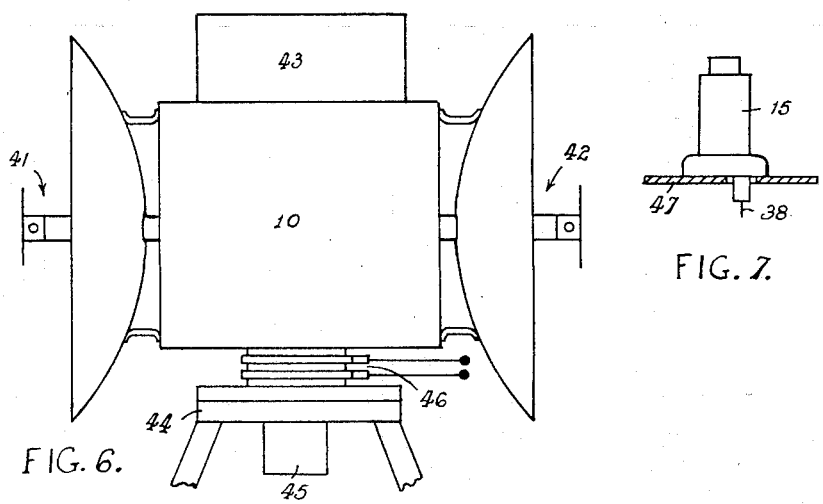
Figure 8:
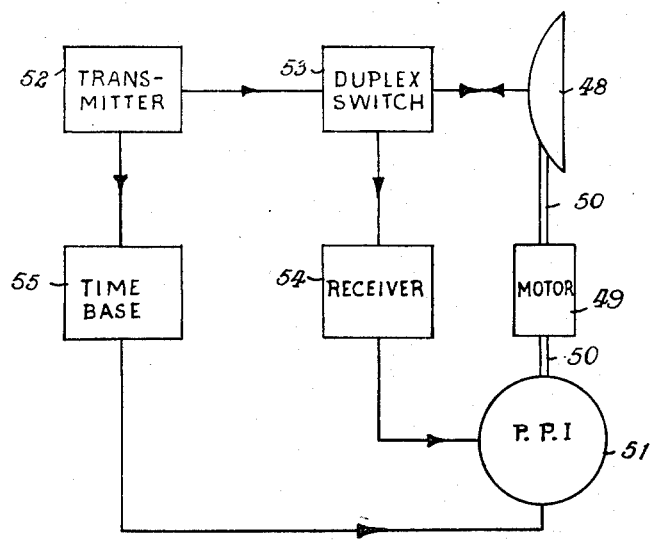

One embodiment of the invention will now be described with reference to the accompanying drawings, in which Figure 1 shows a block diagram of the embodiment, Figure 2 indicates voltage wave forms obtained at certain parts of the equipment, voltage being plotted as ordinate against time as abscissa, Figure 3 illustrates diagrammatically a frequency spectrum in which response is plotted as ordinate against frequency as abscissa, and Figure 4 shows the display that may be obtained on a plan-position indicator forming part of a radar set with which the beacon is co-operating, Figure 5 is a theoretical circuit diagram of parts shown in block form in Figure 1, Figure 6 shows the apparatus of Figure 1 mounted in a rotatable unit comprising two directional antennae, Figure 7 illustrates a practical arrangement of a Klystron and echo box shown in block form in Figure 1, and Figure 8 shows interrogating apparatus for use with a beacon according to the invention.

Referring to Figure 1, the elements constituting the receiver section are shown enclosed in a broken line. An input pulse from an interrogating radar transmitter is passed into a resonator 10 of the well-known "echo-box" type, for example a rectangular cavity with walls of high conductivity material and with each internal dimension, measured in terms of the wave-length of the incident radiation, several wave-lengths long. As is well known such a resonator can be arranged to behave as a tuned circuit of very high magnification-factor, or "Q," having a large number of closely-spaced possible modes of oscillation with frequencies of the same order as that of the incident radiation. This may be seen more clearly by reference to Figure 3, where each vertical line may represent the position of a possible mode of oscillation of the resonator.

The range of frequencies 11 represents the relatively wide frequency band occupied by the interrogating equipments, while the range 22 represents the relatively narrow frequency band occupied by the interrogating pulse from a single radar transmitter having the nominal frequency indicated by F. It will be seen that the resonator 10 has a large number of modes within the range 11; consequently oscillations build up in the resonator during the incidence of the interrogating pulse and decay after its cessation. The oscillations may build up and decay approximately in accordance with the curve of Figure 2(a). The resonator 10 feeds a crystal detector 12, which may be of well-known type and which produces a D. C. pulse also having for example approximately the form shown at Figure 2(a). The pulse is amplified by the amplifier stage 13 and fed to a pulse-generator 14. The amplifier and pulse-generator may be of any of the convenient and well-known types, the pulse-generator being such as to give an output pulse (or a succession of pulses) which, when applied to the oscillator as modulating pulses will cause it to generate suitably coded output pulses. For example, the output from the pulse-generator may be such as that indicated in Figure 2(b), consisting of three negatively-going output pulses of equal duration for each interrogating pulse. The negative pulses from the pulse-generator 14 are reversed in sign and applied to the resonator of a reflector Klystron oscillator 15 and cause this oscillator which is arranged to be normally quiescent, to generate bursts of radio frequency oscillation having the envelope shown in Figure 2(b). There is also applied to the reflector of the reflector Klystron 15 an oscillatory modulating voltage generated by a modulator 16, such for example as that indicated in Figure 2(c). The mean voltage of the reflector is arranged to be such that if the reflector voltage were maintained steadily at this voltage the output frequency would be approximately the mid-frequency of the band 11, that is to say the mean frequency of the radar equipments with which the beacon is to co-operate. The magnitude and frequency of the oscillatory modulating voltage from 16 is such that the output of the oscillator 15 has a frequency spectrum such as that indicated by the range 17 of Figure 3.

The output from the reflector-Klystron 15 is fed to the resonator 10, whence it is radiated to be picked up by the interrogating set. A T/R switch may be included in known manner between 10 and 12 to prevent the transmitted energy from affecting the crystal 12 but this will not normally be necessary. The pulse generator will normally comprise a device such as a blocking oscillator, which will require an appreciably longer time to recover from the effect of the initial received pulse than the interval between that pulse, and the last of the output pulses. The receiver of the interrogating set is arranged to respond to a band of frequencies such as is indicated at 18 in Figure 3, that is to say a part of the radio frequency spectrum transmitted from the beacon will be capable of being received by an individual interrogating equipment.

The display produced on a plan position indicator incorporated in such an equipment may be as indicated in Figure 4 where the centre of the screen is shown at 19, the position of the beacon is indicated at 20 and the markings produced by the coded pulses are shown at 21. It will be seen that a navigator using the equipment will be able to identify the beacon readily.

One form that the parts 14, 15 and 16 of Figure 1 may take is shown in Figure 5. The output pulses from the amplifier 13 in Figure 1 are applied in a positive sense at a terminal 23 to the control grid of the first of a series of coding valves of which only two referenced 24 and 25 are shown. Each coding valve is connected to the next succeeding coding valve by a circuit including a capacitor 26, rectifier 27 and capacitor 28. Resistors 29, 30 and 31 and an inductor 32 are connected as shown. The outputs of these valves are taken in parallel from their screen grids through a transformer 33. A capacitor 28, resistor 31 and inductor 32 are also connected as shown in the grid circuit of the valve 24. Terminals B are connected to points of suitable bias potential.

The valves act in the well-known way as blocking oscillators, the positive pulse on the grid initiating a burst of oscillation and the resulting grid current charging the condenser 28 and so biasing the grid negatively and cutting off the oscillation. The impedance elements associated with the coding valves constitute an artificial line and their values are chosen in accordance with the natures and spacing of the code pulses desired. The rectifiers 27 allow only the positive half cycle of the oscillation to pass to the next valve.

The pulses from the transformer 33 are applied to the control grid of a valve 34 and thence through a transformer 35 to the resonator of a Klystron 15. The modulator 16 comprises a valve 36 connected as shown to generate oscillations and having its anode connected through a capacitor 37 to the reflector of the Klystron 15. A probe 38 serves to couple the resonator of the Klystron to the echo-box as will be described later.

It is clearly not essential that the modulator 16 should generate oscillations continuously. It may conveniently be biased off and allowed to generate oscillations when the bias is lifted, for example, by a pulse from the pulse-generator 14. Thus as shown in Figure 5, the output of the transformer 35 may be applied through a capacitor 39 to the suppressor grid of the valve 36 which is earthed through a high resistor 40.

The echo-box may conveniently be associated with one or more directional antennae, which may be rotated continuously. For example, with a common antenna system for receiving and transmitting, the system may comprise a single rotating directional antenna or a plurality of rotating directional antennae whose maximum lobes are angularly displaced around the axis of rotation either uniformly or non-uniformly. When a rotating directional antenna system is used, the indication given will be intermittent but the risk of over-interrogation of the beacon, that is to say interrogation by two equipments more or less at the same instant (which might give rise to a misleading indication) is diminished, while the indication will still usually be sufficient for navigational purposes.

As shown in Figure 6 the apparatus of Figure 1 together with one or more directional antennae may be rotatably mounted as a unit. In the example shown two directional antennae 41 and 42 are provided and these are mounted upon opposite faces of the echo-box 10. On the top of the echo-box is a casing 43 containing the parts 12, 13, 14, 15 and 16 of Figure 1. The assembly is rotatably mounted on a support 44 and driven by a motor 45. Power is supplied through slip rings and brushes 46.

The way in which the Klystron 15 within the casing 43 may be associated with the echo-box 10 is shown in Figure 7. The inner 38 of a concentric feeder connected with the resonator of the Klystron projects beyond the outer within the echo-box, of which part of the top wall is shown in section at 47, and constitutes a probe.

The crystal detector 12 of Figure 1 may be coupled with the echo-box by means of a short length of wave-guide as is common practice in mixers.

Interrogating apparatus for use with a beacon of the invention may be constituted as shown in Figure 8. A directional antenna 48 is rotated by a motor 49 the shaft 50 of which also rotates the scanning coil of a P. P. I. 51 in known manner. A transmitter 52 is connected through a duplex (or common T and R) switch 53 to the antenna and the antenna applies received signals through the switch 53 to a receiver 54 the output of which is applied to the P. P. I. 51. A time base 55 for the P. P. I. is synchronised from the transmitter 52.

In one example, the radio frequencies picked up and transmitted by the beacon antennae may extend over a range from 9320 to 9500 mc./s. and the frequency of the modulation generated by the modulator 16 may be 3 mc./s.

We claim:

1. A beacon for co-operation with pulse radar sets operating in different, relatively narrow frequency bands within a predetermined, relatively wide band of radio frequencies, said beacon comprising a receiver responsive to incident radiation of any of a large number of frequencies distributed over said band, an oscillator, means to maintain said oscillator normally quiescent, means to apply pulses from the output of said receiver to trigger said oscillator and means to modulate oscillations from said oscillator to distribute radio frequency components thereof over said relatively wide frequency band.

2. A beacon according to claim 1, wherein said oscillator is a Klystron.

3. A beacon for co-operation with pulse radar sets operating in different, relatively narrow frequency bands within a predetermined, relatively wide band of radio frequencies, said beacon comprising a receiver responsive to incident radiation of any of a large number of frequencies distributed over said band, a coding device to generate a train of coded pulses in response to pulses applied thereto, means to apply pulses from said receiver to actuate said coding device, an oscillator, means to maintain said oscillator normally quiescent, means to apply said coded pulses to trigger and modulate said oscillator to generate pulses of radio frequency oscillation corresponding to said coded pulses, and means to modulate said radio frequency oscillations to distribute radio frequency components thereof over said relatively wide frequency band.

4. A beacon for co-operation with pulse radar sets operating in different, relatively narrow frequency bands within a predetermined, relatively wide band of radio frequencies, said beacon comprising a receiver responsive to incident radiation of any of a large number of frequencies distributed over said band, and including a hollow resonator having a large number of resonances within said relatively wide band, an oscillator, means to maintain said oscillator normally quiescent, means to rectify oscillations from said resonator to produce pulses, means to apply said pulses to trigger said oscillator, and means to modulate oscillations from said oscillator to distribute radio frequency components thereof over said relatively wide frequency band.

5. A beacon for co-operation with pulse radar sets operating in different, relatively narrow frequency bands within a predetermined, relatively wide band of radio frequencies, said beacon comprising a receiver responsive to incident radiation of any of a large number of frequencies distributed over said band, an oscillator, means to maintain said oscillator normally quiescent, means to apply pulses from the output of said receiver to trigger said oscillator, an oscillatory valve to modulate oscillations from said oscillator to distribute radio frequency components thereof over said relatively wide frequency band, means to maintain said oscillatory valve normally inoperative and means to apply pulses from said receiver to render said valve operative to generate oscillations.

HAROLD RAYMOND WHITFIELD.
ALBAN HARRISON.

REFERENCES CITED

The following references are of record in the file of this patent:

UNITED STATES PATENTS

| Number | Name | Date |
|---|---|---|
| 2,460,827 | Isely | Feb. 8, 1949 |